(12) United States Patent
Wu

(10) Patent No.: US 8,713,097 B2
(45) Date of Patent: Apr. 29, 2014

(54) ADAPTIVE PERIOD NETWORK SESSION RESERVATION

(75) Inventor: Guangnian Wu, Kanata (CA)

(73) Assignee: Alcatel Lucent, Paris (FR)

( * ) Notice: Subject to any disclaimer, the term of this patent is extended or adjusted under 35 U.S.C. 154(b) by 263 days.

(21) Appl. No.: 13/250,261

(22) Filed: Sep. 30, 2011

(65) Prior Publication Data

US 2013/0086144 A1   Apr. 4, 2013

(51) Int. Cl.
*G06F 15/16* (2006.01)
(52) U.S. Cl.
USPC ............................................ 709/203
(58) Field of Classification Search
None
See application file for complete search history.

(56) References Cited

U.S. PATENT DOCUMENTS

| | | | |
|---|---|---|---|
| 6,148,410 A | 11/2000 | Baskey et al. | |
| 6,496,850 B1 | 12/2002 | Bowman-Amuah | |
| 7,558,256 B1 | 7/2009 | Peterson et al. | |
| 7,899,921 B2 | 3/2011 | Hill et al. | |
| 2004/0088385 A1* | 5/2004 | Blanchet et al. | 709/220 |
| 2004/0148397 A1* | 7/2004 | Aronoff et al. | 709/227 |
| 2008/0056225 A1 | 3/2008 | Brok | |
| 2011/0131308 A1* | 6/2011 | Eriksson | 709/223 |

FOREIGN PATENT DOCUMENTS

WO    0193061 A1    12/2001

OTHER PUBLICATIONS

International Search Report for PCT/CA2012/050607 dated Sep. 4, 2012.

* cited by examiner

*Primary Examiner* — Brian P Whipple
(74) *Attorney, Agent, or Firm* — Kramer & Amado, P.C.

(57) ABSTRACT

The invention is directed to providing communications session management using an adaptive keep-alive reservation technique responsive to network conditions.

22 Claims, 3 Drawing Sheets

ADAPTIVE PERIOD NETWORK SESSION RESERVATION

FIELD OF THE INVENTION

The invention is directed to network communications, and in particular to managing communication sessions between a client node and server node using an adaptive keep-alive reservation technique.

BACKGROUND OF THE INVENTION

Server-side secured network communication sessions typically use periodic keep-alive signals from a client to ensure the communication session is active. Referring to FIG. 1, client 104 sends periodic keep-alive messages 106 to server 102 that informs the server 102 that the client 104 is active and that the session should be maintained. If no keep-alive message is received within a predefined period, such as 30 seconds as indicated in FIG. 1, a periodic expiry timer 108, compares the receipt time of the last keep-alive message against the timeout value of 30 seconds and if the last keep-alive message is older than the timeout value, the server 102 terminates the communication session. This method can have disadvantages such as when the network environment is healthy and stable, the period is shorter than necessary and bandwidth is unnecessarily wasted, and when the network environment deteriorates, network congestion and/or delays can cause keep-alive messages to be delayed and received after the network keep-alive timer times out and terminates the communication session.

Therefore, a means of providing keep-alive functionality that is more efficient when the network is healthy and more robust when the network becomes congested would be highly desirable.

SUMMARY OF THE INVENTION

Some embodiments of the present invention provide a method of controlling a communication session between a server node and a client node. The method comprises steps of: receiving at the client node, from the server node, a delay message comprising a delay value; calculating a keep-alive reservation value responsive to the received delay value; and sending from the client node to the server node, a keep-alive message comprising the keep-alive reservation value representing a time when a subsequent keep-alive message should arrive at the server node.

In some embodiments of the present invention, the delay value represents a delay between when the server node received the preceding keep-alive message and a current keep-alive reservation time.

In some embodiments of the present invention, the step of calculating the keep-alive reservation value: increases the keep-alive reservation value from the keep-alive reservation value of the preceding keep-alive message if the received delay is below a predefined threshold; or decreases the keep-alive reservation value from the keep-alive reservation value of the preceding keep-alive message if the received delay is above the predefined threshold.

In some embodiments of the present invention, the increasing or decreasing step increases or decreases the keep-alive reservation value by a predetermined period of time.

In some embodiments of the present invention, the step of calculating the second keep-alive reservation value further comprises a probabilistic function.

In some embodiments of the present invention, the probabilistic function uses a pseudo-random number to determine a probability of the increasing or decreasing step.

In some embodiments of the present invention, the pseudo-random number is computed from the received delay value.

In some embodiments of the present invention, the pseudo-random number is computed by calculating the received delay value modulo a predefined integer value.

In some embodiments of the present invention, the increasing step increases the keep-alive reservation value only if the ratio of the predefined threshold and a predefined maximum reservation value is greater than the pseudo-random number; or the decreasing step decreases the keep-alive reservation value only if the ratio of the predefined threshold and a predefined minimum reservation value is greater than the pseudo-random number.

Some embodiments of the present invention provide a tangible and non-transitory machine-readable storage medium encoded with instructions thereon for execution by a client node. The tangible and non-transitory machine-readable storage medium comprises: instructions for receiving at the client node, from a server node, a delay message comprising a delay value; instructions for calculating a keep-alive reservation value responsive to the received delay value; and instructions for sending from the client node to the server node, a keep-alive message comprising the keep-alive reservation value representing a time when a subsequent keep-alive message should arrive at the server node.

In some embodiments of the present invention, the instructions for the step of calculating the keep-alive reservation value: instruct the client node to increase the keep-alive reservation value from the keep-alive reservation value of the preceding keep-alive message if the received delay is below a predefined threshold; or instruct the client node to decrease the keep-alive reservation value from the keep-alive reservation value of the preceding keep-alive message if the received delay is above the predefined threshold.

In some embodiments of the present invention, the instructions for the step of calculating the second keep-alive reservation value further comprise a probabilistic function.

In some embodiments of the present invention, the instructions for the increasing step instruct the client node to increase the keep-alive reservation value only if the ratio of the predefined threshold and a predefined maximum reservation value is greater than the pseudo-random number; or the instructions for the decreasing step instruct the client node to decrease the keep-alive reservation value only if the ratio of the predefined threshold and a predefined minimum reservation value is greater than the pseudo-random number.

Some embodiments of the present invention provide a method of controlling a communication session between a server node and a client node. The method comprises steps of receiving at the server node, from the client node, a keep-alive message comprising a keep-alive reservation value representing a keep-alive reservation time; logging a receipt time of the keep-alive message; calculating a delay value by comparing the receipt time with a current keep-alive reservation time; sending from the server node to the client node, a delay message comprising the delay value; and updating the current keep-alive reservation time with the keep-alive reservation time corresponding to the received keep-alive reservation value.

Some embodiments of the present invention further comprise steps of: comparing at the server node, the delay time with a predefined expiry timer; and terminating the communication session if the delay time exceeds the predefined expiry timer.

Some embodiments of the present invention provide a tangible and non-transitory machine-readable storage medium encoded with instructions thereon for execution by a server node, wherein the tangible and non-transitory machine-readable storage medium comprises: instructions for receiving at the server node, from the client node, a keep-alive message comprising a keep-alive reservation value representing a keep-alive reservation time; instructions for logging a receipt time of the keep-alive message; instructions for calculating a delay value by comparing the receipt time with a current keep-alive reservation time; instructions for sending from the server node to the client node, a delay message comprising the delay value; and instructions for updating the current keep-alive reservation time with the keep-alive reservation time corresponding to the received keep-alive reservation value.

Some embodiments of the present invention further comprise: instructions for comparing at the server node, the delay time with a predefined expiry timer; and instructions for terminating the communication session if the delay time exceeds the predefined expiry timer.

BRIEF DESCRIPTION OF THE DRAWINGS

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Embodiments of the present invention use a reservation scheme whereby the period of keep-alive messages can be adjusted by means of a keep-alive reservation value transmitted from a client node to a server node. The keep-alive reservation value indicates how much later the server should expect the next message. At the server node, the session expiry period is thus checked against the delta of last expected time and actual time when the server node processes the incoming reservation value. This scheme removes the limitation of requiring the resend period to be smaller than the expiry limit, opening door for variable periodic messaging.

Figure 1:
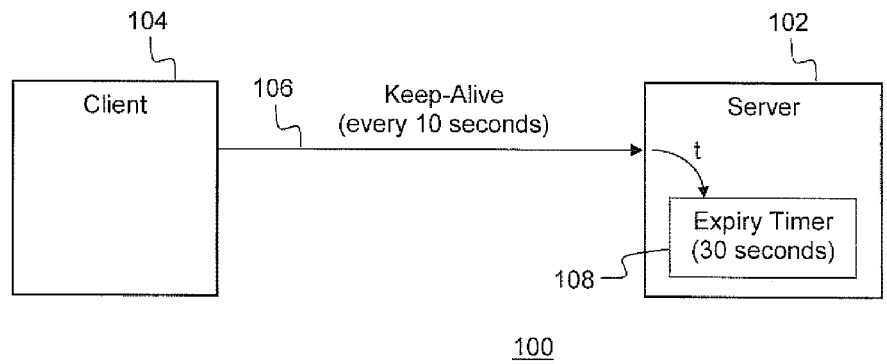
FIG. 1 illustrates a prior art keep-alive for a communication session.
Figure 2:
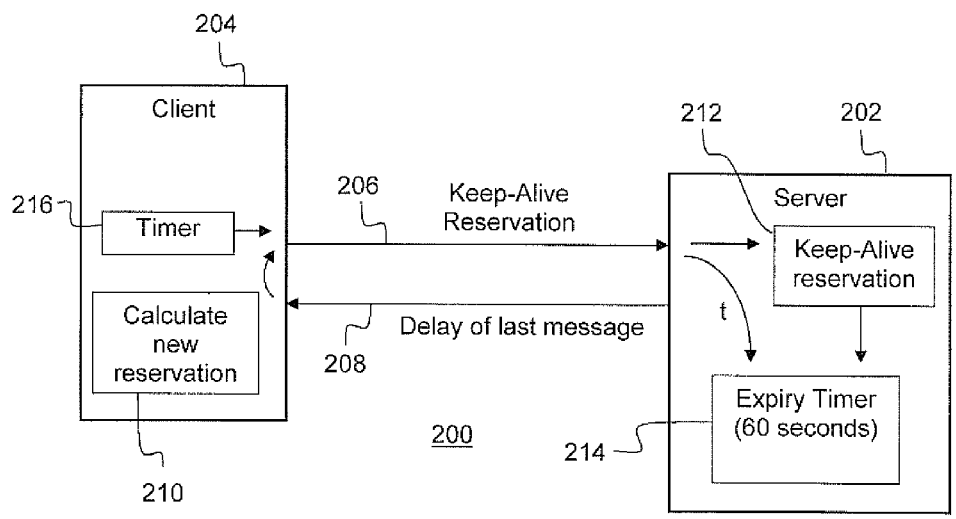
FIG. 2 illustrates an adaptive period network reservation system according to an embodiment of the present invention.

FIG. 2 illustrates an adaptive period network reservation system 200 according to embodiments of the invention. Server node 202 provides a communication session to client node 204. Note that server node 202 can provide such communications sessions to multiple client nodes. The server node 202 and client node 204 can be connected directly or through a network or multiple networks such as the Internet. The client node and server node can be geographically remote from each other as well.

Unlike typical keep-alive mechanisms, the system 200 provides an adaptive mechanism whereby client node 204 communicates a keep-alive reservation value in a keep-alive reservation message 206 to server node 202. The keep-alive reservation value represents the keep-alive reservation time which is the time when the server should expect the next keep-alive reservation message. Advantageously, this allows communication session expiry timer 214 at server node 202 to defer timeout of the communication session to some point in the future without the need to lengthen the expiry limit. The keep-alive reservation time is conveyed as a keep-alive reservation value relative to the current time instead of an absolute time so as to minimize the effect of any clock skew between the client node 204 and the server node 202. When the client node sends keep-alive reservation message 206, it also starts an internal timer 216 corresponding to the keep-alive reservation time represented in the keep-alive reservation message 206, to trigger the sending of the subsequent keep-alive reservation message 206.

Server node 202 logs the time of receipt of the keep-alive reservation message 206 and compares it to a current keep-alive reservation time stored in memory 212 to determine a delay value representing the delay between when the server node 202 actually received it. This delay value is then communicated to the client node 204 by delay message 208.

The server node 202 then adds the time of receipt of the keep-alive reservation message 206 to the keep-alive reservation value it contains, to calculate an absolute keep-alive reservation time which is stored in memory 212.

Note that the current keep-alive reservation time stored in memory 212 represents the time when server 202 is expecting the next keep-alive message 206. The session expiry timer 214 which runs periodically, such as every 60 seconds, uses the current keep-alive reservation time stored in memory 212 to determine if the communication session between client node 204 and server node 202 should be terminated.

Client node 204 receives delay message 208 and uses it as feedback to permit the client node to calculate a new keep-alive reservation value to send out on the next keep-alive reservation message. At this point, the internal timer 216 tracking the previous keep-alive reservation time triggers the next keep-alive reservation message to be transmitted to server node 202. If network congestion is low, the message should arrive close to the time the server node is expecting the message.

In general terms, when the delay value is high, the next keep-alive reservation value should be lower than the previous one in order to compensate for the degradation of messaging quality in the communication session. When delay value is low, the next keep-alive reservation value should be higher than the previous one in order improve efficiency and not to waste resources on the client and server nodes and over the network. In this manner, the resend period heuristic and adaptive with regard to overall delay.

In more detail, the process 210 to calculate the new keep-alive reservation value uses a predefined threshold of delay. If the incoming delay value is greater than predefined threshold, next keep-alive reservation value is decremented by one predefined period of time from the value of the previous keep-alive reservation value. If the incoming delay value is less than predefined threshold, next keep-alive reservation value is incremented by one predefined period of time from the value of the previous keep-alive reservation value. If the incoming delay value is substantially the same as the predefined threshold, the next keep-alive reservation value is set to the same value as the previous keep-alive reservation value. The system also has a predefined maximum reservation value (e.g.: 10 seconds) and a predefined minimum reservation value (e.g.: 1 second).

Because such a system could oscillate unnecessarily around the predefined threshold, some hysteresis is introduced by applying a probabilistic fuzzy logic function. A different pseudo-random number, expressed as a value between zero (0) and one (1) and having a substantially evenly distributed probability across that at range, is used each time a new keep-alive reservation value is calculated such that the next keep-alive reservation value is incremented only if the ratio of the predefined threshold and the predefined maximum reservation value is greater than the pseudo-random number or the next keep-alive reservation value is decremented only if the ratio of the predefined threshold and the predefined minimum reservation value is greater than the pseudo-random number.

A relatively efficient way to generate a pseudorandom number is to retrieve the delay value, expressed in milliseconds, from message 208 and divide it by a small integer divisor, for example five (5) and use the remainder or modulo as a pseudo-random number. This will generate a pseudo-random number between zero (0) and four (4), having an approximate average probability of 1/divisor for each of the values 0, 1, 2, 3, 4. It is a simple matter, well understood by persons of skill in the art, to express these pseudo-random numbers in a range between 0 and 1.

Figures 3, 4:
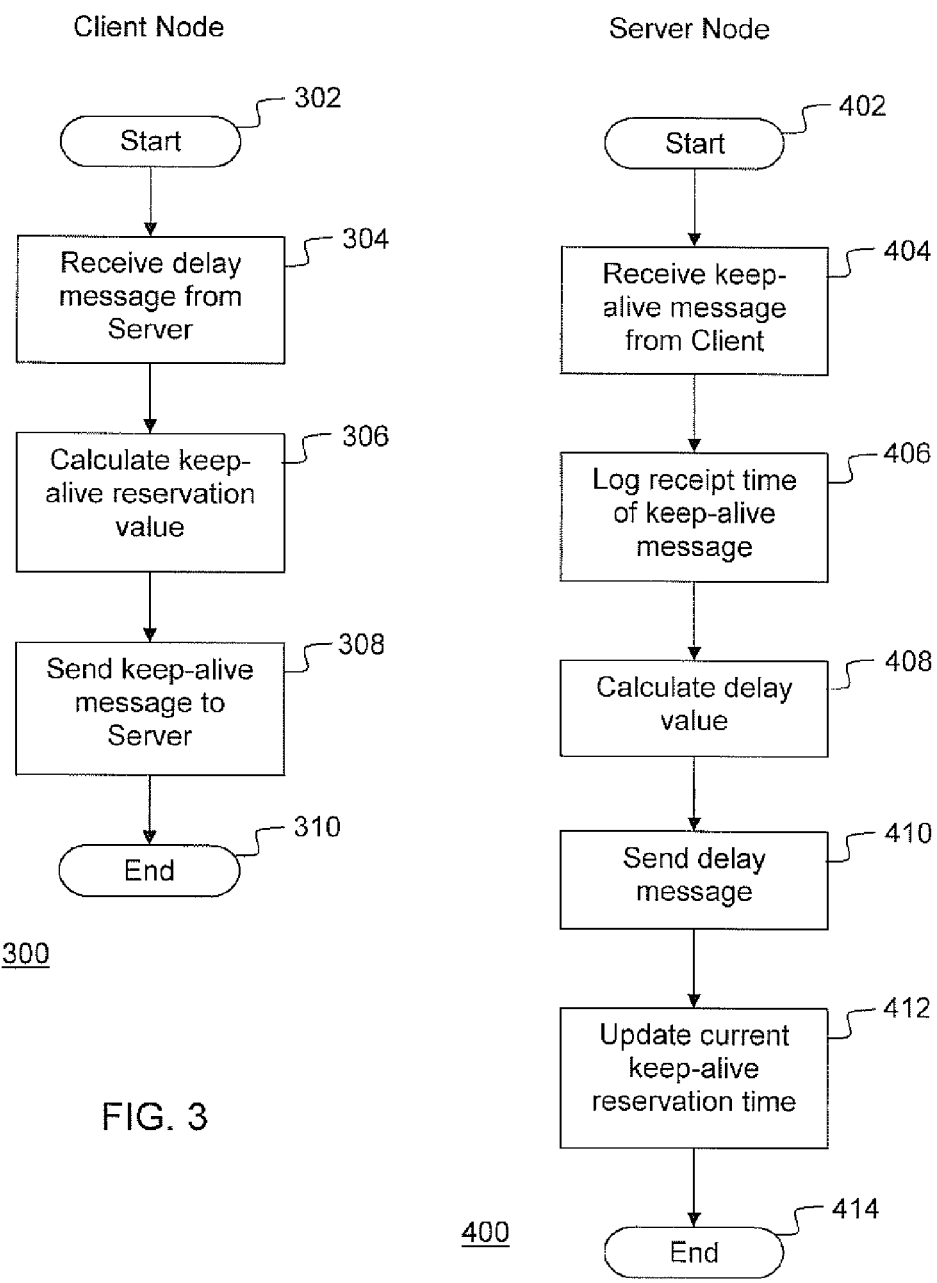
FIG. 3 illustrates a flowchart for a method at a client node to control a keep-alive reservation value according to an embodiment of the present invention.
FIG. 4 illustrates a flowchart for a method at a server node according to an embodiment of the present invention.

FIG. 3 illustrates a flowchart for method 300 at client node 204 to control a keep-alive reservation value. The process starts at step 302. At step 304 the client node 204 receives delay message 208 from server node 202. At step 306 client node 204 calculates a new keep-alive reservation value. At step 308, the client node 204 sends keep-alive reservation message 206 containing the new keep-alive reservation value to server node 202. The process stops at step 310.

FIG. 4 illustrates a flowchart for method 400 at server node 202. The process starts at step 402. At step 404 the server node 202 receives keep-alive reservation message 206 from client node 204. At step 406 the server node 202 logs the receipt time of keep-alive message 206. At step 408 the server node 202 calculates a delay value by subtracting the current keep-alive reservation time stored in memory 212 from the receipt time of keep-alive message 206. At step 410 the server node 202 sends the delay message 208 containing the delay value to client node 204. At step 412 the server node 202 updates the current keep-alive reservation time stored in memory 212. The process ends at step 414.

Figure 5:
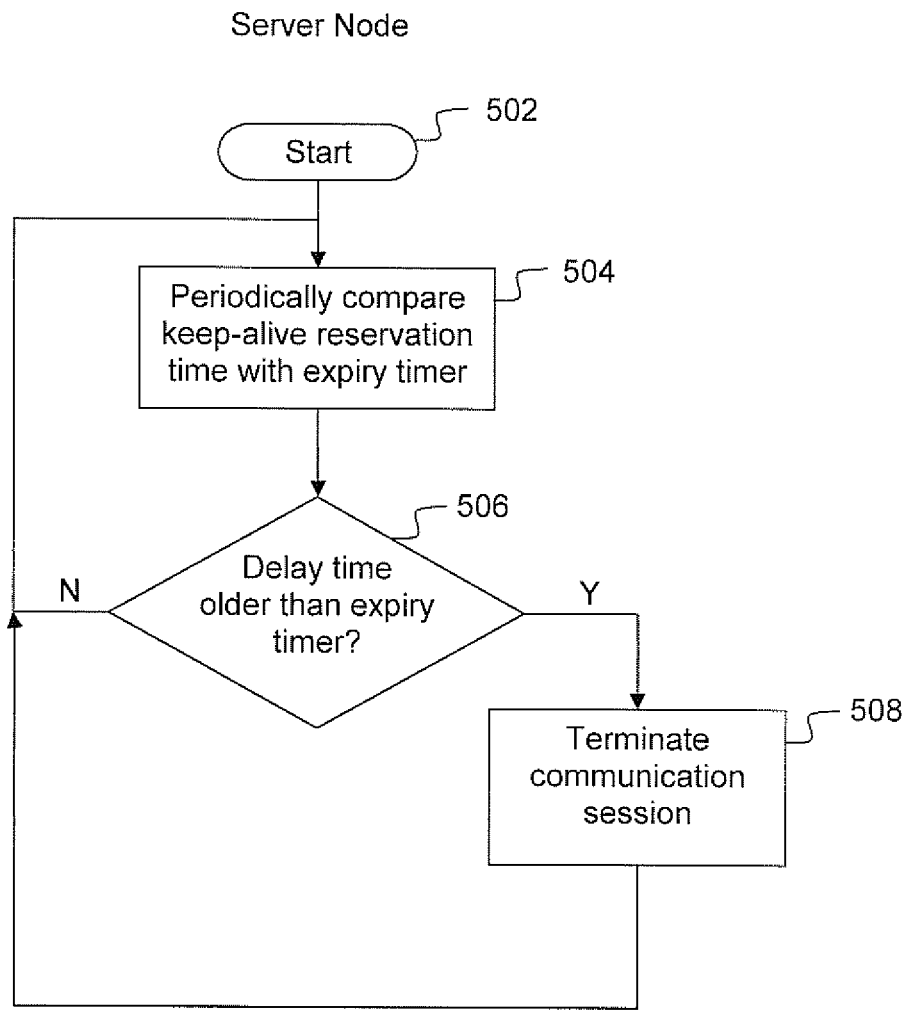
FIG. 5 illustrates a flowchart for a method at a server node to control a communication session time-out according to an embodiment of the present invention.

FIG. 5 illustrates a flowchart for method 500 at server node 202 to control a communication session time-out. The process starts at step 502. At step 504 the server node 202 periodically compares the keep-alive reservation time stored in memory 212 with expiry timer 214. For example, this can occur every 60 seconds. At step 506, if the delay time is older than the expiry time (e.g.: 60 seconds) then the server node 202 terminates the communication session at step 508. The process ends loops back to step 504 to be executed periodically.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method of controlling a communication session between a server node and a client node, said method comprising steps of:
   receiving at said client node, from said server node, a delay message comprising a delay value;
   calculating a keep-alive reservation value responsive to said received delay value; and
   sending from said client node to said server node, a keep-alive message comprising said keep-alive reservation value representing a time when a subsequent keep-alive message should arrive at said server node.

2. The method of claim 1, wherein said delay value represents a delay between when said server node received the preceding keep-alive message and a current keep-alive reservation time.

3. The method of claim 1, wherein said step of calculating said keep-alive reservation value:
- increases said keep-alive reservation value from the keep-alive reservation value of said preceding keep-alive message if said received delay is below a predefined threshold; or
- decreases said keep-alive reservation value from the keep-alive reservation value of said preceding keep-alive message if said received delay is above said predefined threshold.

4. The method of step 3, wherein said increasing or decreasing step increases or decreases said keep-alive reservation value by a predetermined period of time.

5. The method of claim 3, wherein said step of calculating said second keep-alive reservation value further comprises a probabilistic function.

6. The method of step 5, wherein said probabilistic function uses a pseudo-random number to determine a probability of said increasing or decreasing step.

7. The method of step 6, wherein said pseudo-random number is computed from said received delay value.

8. The method of step 7, wherein said pseudo-random number is computed by calculating the received delay value modulo a predefined integer value.

9. The method of step 8, wherein:
- said increasing step increases said keep-alive reservation value only if the ratio of said predefined threshold and a predefined maximum reservation value is greater than said pseudo-random number; or
- said decreasing step decreases said keep-alive reservation value only if the ratio of said predefined threshold and a predefined minimum reservation value is greater than said pseudo-random number.

10. A tangible and non-transitory machine-readable storage medium encoded with instructions thereon for execution by a client node, wherein said tangible and non-transitory machine-readable storage medium comprises:
- instructions for receiving at said client node, from a server node, a delay message comprising a delay value;
- instructions for calculating a keep-alive reservation value responsive to said received delay value; and
- instructions for sending from said client node to said server node, a keep-alive message comprising said keep-alive reservation value representing a time when a subsequent keep-alive message should arrive at said server node.

11. The tangible and non-transitory machine-readable storage medium of claim 10, wherein said delay value represents a delay between when said server node received the preceding keep-alive message and a current keep-alive reservation time.

12. The tangible and non-transitory machine-readable storage medium of claim 10, wherein said instructions for said step of calculating said keep-alive reservation value:
- instruct said client node to increase said keep-alive reservation value from the keep-alive reservation value of said preceding keep-alive message if said received delay is below a predefined threshold; or
- instruct said client node to decrease said keep-alive reservation value from the keep-alive reservation value of said preceding keep-alive message if said received delay is above said predefined threshold.

13. The tangible and non-transitory machine-readable storage medium of claim 12, wherein said increasing or decreasing step increases or decreases said keep-alive reservation value by a predetermined period of time.

14. The tangible and non-transitory machine-readable storage medium of claim 12, wherein said instructions for said step of calculating said second keep-alive reservation value further comprise a probabilistic function.

15. The tangible and non-transitory machine-readable storage medium of claim 14, wherein said probabilistic function uses a pseudo-random number to determine a probability of said increasing or decreasing step.

16. The tangible and non-transitory machine-readable storage medium of claim 15, wherein said pseudo-random number is computed from said received delay value.

17. The tangible and non-transitory machine-readable storage medium of claim 16, wherein said pseudo-random number is computed by calculating the received delay value modulo a predefined integer value.

18. The tangible and non-transitory machine-readable storage medium of claim 17, wherein:
- said instructions for said increasing step instruct said client node to increase said keep-alive reservation value only if the ratio of said predefined threshold and a predefined maximum reservation value is greater than said pseudo-random number; or
- said instructions for said decreasing step instruct said client node to decrease said keep-alive reservation value only if the ratio of said predefined threshold and a predefined minimum reservation value is greater than said pseudo-random number.

19. A method of controlling a communication session between a server node and a client node, said method comprising steps of:
- receiving at said server node, from said client node, a keep-alive message comprising a keep-alive reservation value representing a keep-alive reservation time;
- logging a receipt time of said keep-alive message;
- calculating a delay value by comparing said receipt time with a current keep-alive reservation time;
- sending from said server node to said client node, a delay message comprising said delay value; and
- updating said current keep-alive reservation time with said keep-alive reservation time corresponding to said received keep-alive reservation value.

20. The method of claim 19, further comprising steps of:
- comparing at said server node, said delay time with a predefined expiry timer; and
- terminating said communication session if said delay time exceeds said predefined expiry timer.

21. A tangible and non-transitory machine-readable storage medium encoded with instructions thereon for execution by a server node, wherein said tangible and non-transitory machine-readable storage medium comprises:
- instructions for receiving at said server node, from said client node, a keep-alive message comprising a keep-alive reservation value representing a keep-alive reservation time;
- instructions for logging a receipt time of said keep-alive message;
- instructions for calculating a delay value by comparing said receipt time with a current keep-alive reservation time;
- instructions for sending from said server node to said client node, a delay message comprising said delay value; and
- instructions for updating said current keep-alive reservation time with said keep-alive reservation time corresponding to said received keep-alive reservation value.

22. The tangible and non-transitory machine-readable storage medium of claim 21, further comprising:
- instructions for comparing at said server node, said delay time with a predefined expiry timer; and
- instructions for terminating said communication session if said delay time exceeds said predefined expiry timer.

\* \* \* \* \*